United States Patent
Douglas

(10) Patent No.: US 6,250,454 B1
(45) Date of Patent: Jun. 26, 2001

(54) STORAGE BUFFER FOR A MULTI LANE CONVEYOR

(75) Inventor: John J. Douglas, Lynch Station, VA (US)

(73) Assignee: Danville Automation Holdings, LLC, Lynchburg, VA (US)

( * ) Notice: Subject to any disclaimer, the term of this patent is extended or adjusted under 35 U.S.C. 154(b) by 0 days.

(21) Appl. No.: 09/338,099

(22) Filed: Jun. 23, 1999

(51) Int. Cl.[7] ............................... B65G 1/00; B65G 37/00
(52) U.S. Cl. ....................... 198/347.1; 198/347.3
(58) Field of Search .................. 198/347.1, 347.3, 198/347.2, 435, 582

(56) References Cited

U.S. PATENT DOCUMENTS

| | | |
|---|---|---|
| 3,565,725 * | 2/1971 | Siempelkamp .................. 198/435 X |
| 4,516,819 | 5/1985 | Wiernicki . |
| 4,725,182 | 2/1988 | Sakamoto et al. . |
| 4,900,212 | 2/1990 | Mikahara . |
| 4,964,498 | 10/1990 | Klingl . |
| 4,995,769 * | 2/1991 | Berger et al. .................. 198/347.1 X |
| 5,176,242 | 1/1993 | Wegscheider . |
| 5,253,743 | 10/1993 | Haas, Sr. et al. . |
| 5,511,651 | 4/1996 | Barth . |

* cited by examiner

Primary Examiner—Christopher P. Ellis
Assistant Examiner—Gene O. Crawford
(74) Attorney, Agent, or Firm—St. Onge Steward Johnston & Reens LLC

(57) ABSTRACT

A storage buffer for a multi lane conveyor system is provided, which generally consists of a carriage containing a plurality of storage magazines each having a plurality of storage conveyors, means for raising and lowering the carriage such that an article can be fed to and discharged from each storage conveyor, at least two drive systems for running the storage conveyors of each magazine one at a time, and at least two drive means for driving the two drive systems.

22 Claims, 5 Drawing Sheets

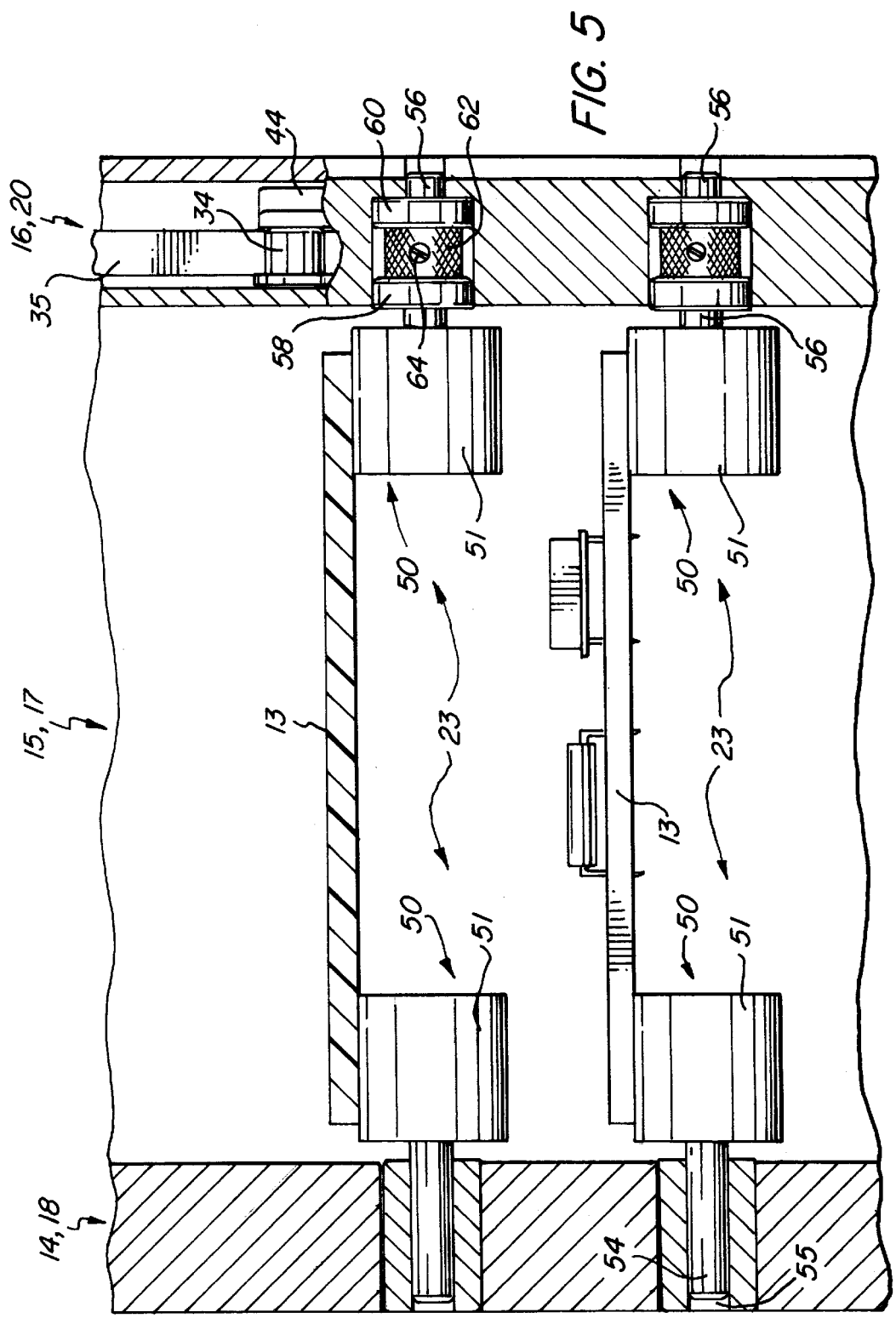

STORAGE BUFFER FOR A MULTI LANE CONVEYOR

FIELD OF THE INVENTION

The invention relates to an apparatus for storing articles on a conveyor system. More specifically, the invention relates to a storage buffer for use in a conveyor system having at least two side-by-side driven lanes

BACKGROUND OF THE INVENTION

Due to space limitations and the cost of operating conveying lines, the efficiency of a conveyor system is a substantial consideration. Thus, buffer systems are often required to store articles on a conveyor system to maximize throughput efficiency.

Two lane conveying systems are desirable because they can effectively double the articles manufactured within a given time period. However, a major concern of two rail conveyor systems is the space required for such systems, particularly when a single lane conveyor, or a portion thereof, is being replaced by a two rail conveyor system. For instance, for the present invention it is desirable to have a space of only approximately one to two inches between the two lanes.

U.S. Pat. Nos. 4,964,498 to Klingl and 5,253,743 to Haas, Sr. et al. both disclose conveyors having side by side vertical storage buffers. U.S. Pat. No. 5,176,242 to Wegscheider discloses two buffer magazines 12, 32 positioned one after the other. The Klingl, Haas and Wegscheider conveyor systems, however, use the side by side buffers to efficiently convey articles in a single lane, not two lanes.

U.S. Pat. No. 4,561,819 to Wiernicki discloses a conveyor magazine having the shape of a vertical stack for storing printed circuit boards (PCBs). The Wiernicki magazine, however, does not include conveyors on each level of the magazine to load and withdraw articles. The Wiernicki magazine relies on rollers 80 external to the magazine to load and withdraw articles. Relying on an external drive system for a magazine can be disadvantageous if the magazine is being retrofitted to an existing system without an appropriate drive system.

None of the above patents discloses a storage buffer for use with a conveyor system having two side-by-side driven lanes.

What is desired, therefore, is a two magazine multi-level storage buffer that can convey articles on each storage level and be used with a conveyor system having two side-by-side driven lanes, and that adheres to strict width limitations between the lanes.

SUMMARY OF THE INVENTION

Accordingly, an object of the present invention is to provide a multi conveying lane storage buffer that occupies a narrow width.

It is a further object of the present invention to provide a multi conveying lane storage buffer that includes a conveyor on each level of storage.

It is yet another object of the present invention to provide a multi conveying lane storage buffer wherein the drive mechanisms for horizontally conveying articles within the buffer are contained within the buffer walls.

It is still another object of the present invention to provide a multi conveying lane storage buffer wherein the opposing side walls for the buffer are identical in construction.

These objects of the invention are achieved by a storage buffer for a multi lane conveyor system, which generally consists of a carriage containing a plurality of storage magazines each having a plurality of storage conveyors, drive means for raising and lowering the carriage such that an article can be fed to and discharged from each storage conveyor, at least two drive mechanisms for running the storage conveyors of each magazine one at a time, and at least two drive means for driving the two drive systems.

BRIEF DESCRIPTION OF THE DRAWINGS

FIG. 5 is a partial front exposed view of the of the storage buffer of FIG. 1.

DETAILED DESCRIPTION OF THE INVENTION

Figure 1:
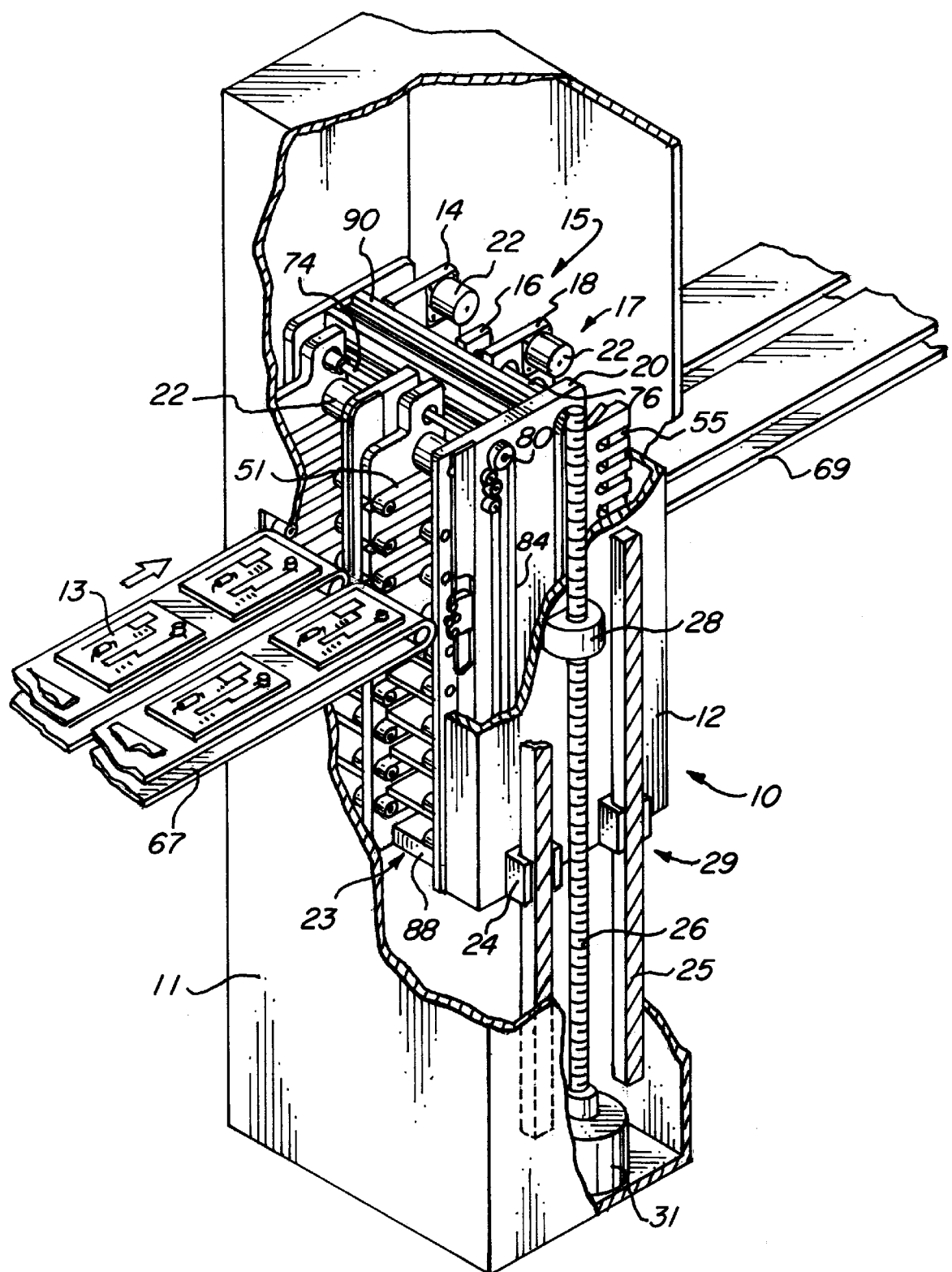
FIG. 1 is a front isometric view of the storage buffer for a multi lane conveyor in accordance with the present invention.

The storage buffer 10 in accordance with the present invention is shown in FIG. 1. The storage buffer 10 includes a housing 11 and a carriage 12 within the housing having first and second magazines 15, 17. The first magazine has two mirror image side walls 14, 16 and the second magazine has mirror image side walls 18 and 20. Horizontal members 88 and 90 connect the four side walls 14, 16, 18, 20 together.

The height of carriage 12 is preferably adjusted by a servo motor 31 having a threaded screw 26. Alternatively, instead of a motor 31, other means could be used to adjust the height of carriage 12, such as a pneumatic or hydraulic motor. A ball bushing 28 has an internal thread and is threadedly attached to the screw 26. The ball bushing 28 is attached to the buffer carriage 12 and moves the carriage vertically when the bushing moves vertically along the screw 26. A linear bearings assembly 29 keeps the carriage 12 from tilting as it is moved vertically and is preferably placed on both outside walls of the carriage. The linear bearings assembly includes linear bearings 24 attached to the outside walls of the carriage 12 and linear guides 25 attached to the housing. Each of the linear guides 25 moves through one or more linear bearings 24 which guide the movement of the carriage 12 as it moves vertically.

Two width adjustment cranks (not shown) allow the separate adjustment of width of the first and second magazines respectively. One crank adjusts endless belt 84 around wheel 80 which is connected to a threaded shaft 74 that adjusts the width of the first magazine. Another crank adjusts endless belt 86 around wheel 82 which is connected to a threaded shaft 76 that adjusts the width of the second magazine 17.

Figure 2:
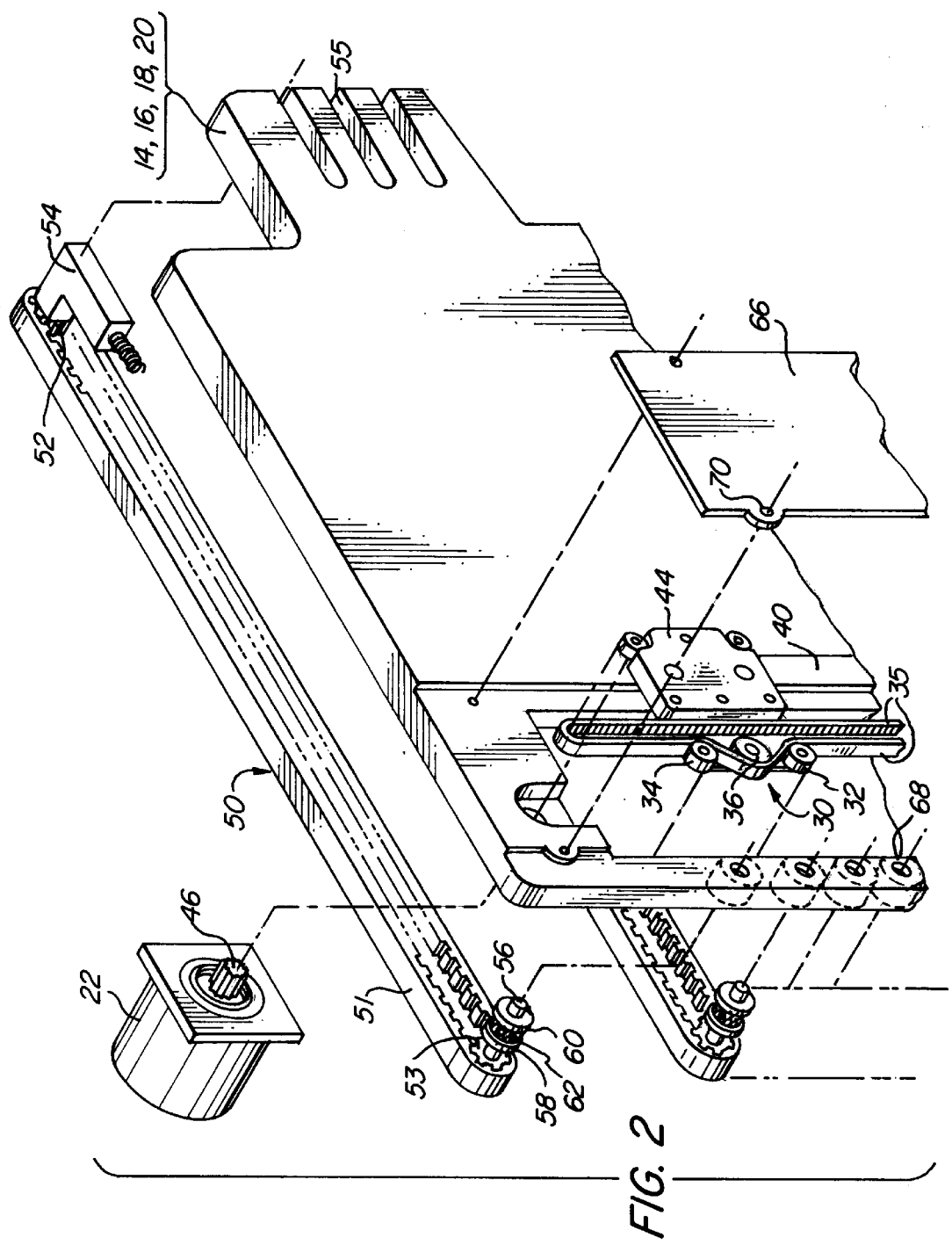
FIG. 2 is an exploded front isometric view of an external wall of the storage buffer of FIG. 1.
Figure 3:
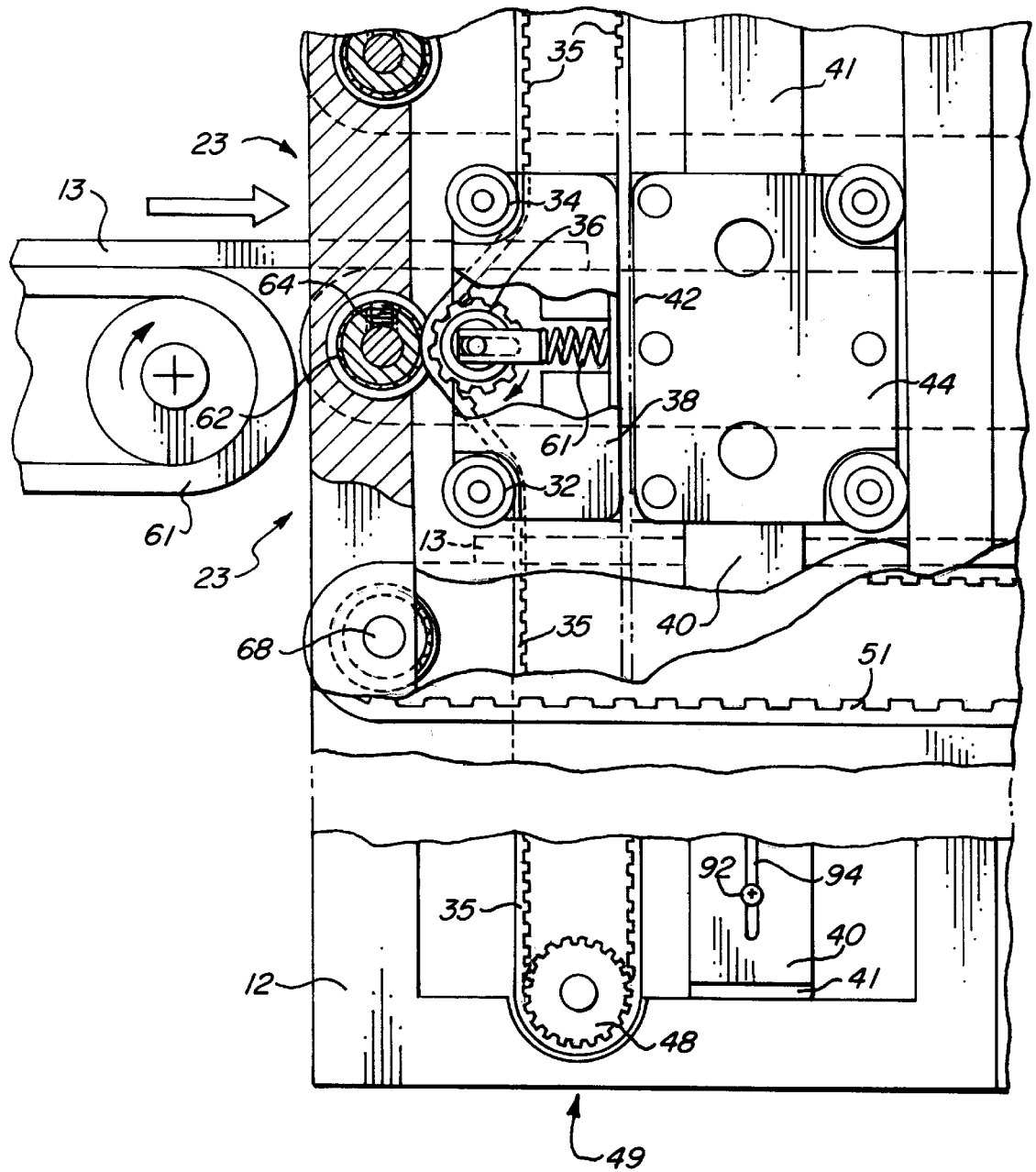
FIG. 3 is a partial exposed side view of an external wall of the storage buffer of FIG. 1.

Each storage magazine 15, 17 has a plurality of storage conveyors 23. Referring now to FIGS. 2, 3 and 5, each storage conveyor 23 comprises opposing belt mechanisms 50 having endless belts 51 driven by wheels 52 and 53. Wheel 52 has a shaft that is connected to a spring loaded belt take up 54. Each belt take up 54 snugly fits into one of a plurality of panel slots 55, each being located in the side walls 14, 16, 18, 20 at each conveyor level. Wheel 53 is connected to shaft 56 which has connected to it a knurled driven roll 62 between two bearings 58, 60. The shaft 56 fits into one of the holes 68 in the cover 66 of the side walls 14, 16, 18, and 20. The knurled driven roll 62 is connected to shaft 56 by a set screw 64 that is screwed into a dimpled hole that extends through the roll and into the shaft. The knurled driven roll 62 is driven by the endless belt 35 of conveyor drive system 49 when the mechanism 30 is adjacent the knurled driven roll.

Each drive mechanism 30 includes a pressure wheel 36 and preferably two opposing rollers 32, 34 configured such that an endless belt 35 can pass between the wheel and rollers. The drive mechanism 30 preferably further includes a positioning bar 40 that can slide vertically in a recess 41 to initially position the drive mechanism near the conveyor infeed. The positioning bar 40 can be secured in the recess 41, for example, by fastening a screw 92 through a slot 94 in the positioning bar. The drive mechanism 30 has covers 38 and 44 to contain the endless belt 35 and positioning bar 40. A slot 42 is provided for the return passage of the endless belt 35.

Preferably, the wheels herein are toothed wheels and the belts are toothed belts. Alternatively, bands, cords or chains could be used in place of the belts.

Each conveyor drive system 49 includes a motor 22, a drive wheel 46, a driven wheel 48 and a drive mechanism 30. With the exception of motors 22, each buffer side wall 14, 16, 18, 20 has located within its interior a conveyor drive mechanism 49 for driving the conveyors on each level one at a time. Each motor 22 is located at the top of the side wall 14, 16, 18, 20 above the storage conveyors 23, which drives an endless belt 35 being looped around a drive wheel 46 and a driven wheel 48. Other drive means instead of motors 22 could be used to drive the conveyor drive system 49, such as a pneumatic or hydraulic motor. The belt 35 is preferably an endless toothed belt to prevent belt slippage. The endless belt 35 engages the pressure wheel 36 and two opposing rollers 32, 34 of the drive mechanism 30. The drive mechanism 30 remains stationary with respect to the carriage 12 as the carriage moves vertically.

Figure 4:
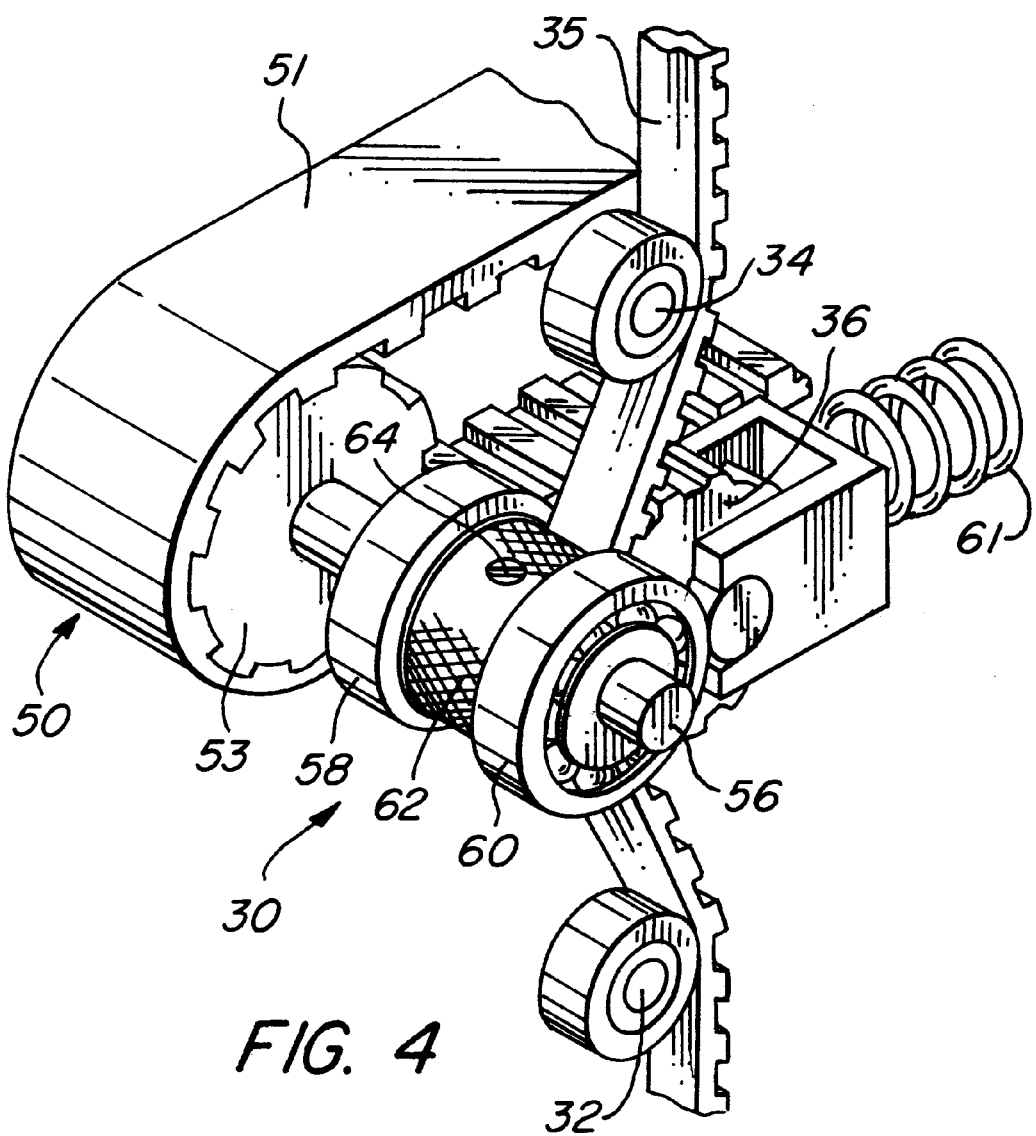
FIG. 4 is a partial front isometric view of a belt mechanism and a drive mechanism of the storage buffer of FIG. 1.

When an article is desired to be fed into or discharged from the buffer, the storage conveyor 23 of the buffer is moved near the infeed conveyor 67 by adjusting the height of the carriage 12 using the servo motor 31. As shown best in FIG. 4, when the desired storage conveyor 23 is horizontally adjacent the drive mechanisms 30, the rolls 62 from the belt mechanisms 50 come into contact with the endless belts 35 being pressurized by the pressure wheel 36 and the springs 61. It should be noted that when drive mechanism 30 is moved adjacent to or past a belt mechanism 50 and belt 35 comes into contact with roller 62, the belt may rotate the roller a small amount.

For each magazine 15, 17, the motors 22 connected to its side walls are operated in sync, but with opposite rotation. If the first magazine 15 needs to be loaded or discharged, motors 22 mounted to walls 14 and 16 are run which drives two belt mechanisms 50 for the conveyor 23 of the first magazine 15. Likewise, if the second magazine needs to be loaded or discharged, motors 22 mounted to walls 18 and 20 are run. For each magazine 15, 17, the two corresponding motors 22 are required to have opposite rotations for two opposing belt mechanisms 50 to operate in union.

Preferably, as shown in FIG. 1, the buffer 10 comes with an infeed conveyor 67 and a discharge conveyor 69 that can be disabled. The drive mechanism 30 is located near the infeed conveyor 67 such that the drive mechanism will operate the conveyor of the carriage level near the infeed conveyor.

Preferably, to control the operation of the buffer 10, a microprocessor (not shown) is used to control the vertical adjustment of the carriage 12. Generally, the buffer 10 will function as either a first-in first-out buffer to keep the articles in a sequential order or a last-in first-out buffer to minimize cycle time of the articles. The microprocessor may be interfaced or networked with other processors or computers that control a manufacturing system used in conjunction with the buffer 10.

In operation, an article 13 such as a printed circuit board (PCB) is transported to the buffer 10 by an infeed conveyor 67. The microprocessor decides whether the buffer carriage 12 needs to be adjusted vertically to store the article. If necessary, the carriage 12 is adjusted vertically by operating the servo motor 31 which locates the drive mechanisms 30 to the desired level in contact with the belt 35. Motors 22 are then operated in pairs to move one or both conveyors 23 at the infeed conveyor. The magazines 15, 17 are also discharged by vertically adjusting the carriage 12 and operating the motors 22 to move a conveyor 23.

Although the description and drawings show the invention as having two magazines 15, 17, it should be apparent that the present invention could include one or more magazines by removing or adding more side walls 14, 16, 18, 20, horizontal supports 80, 90, storage conveyors 23, conveyor drive mechanisms 30, and motors 22 as described herein.

It should be apparent to one skilled in the art that each magazine 15, 17 could vertically moved independently of the other such that each magazine 15, 17 can intake and discharge articles independently. To facilitate this, each magazine 15, 17 can be independently adjusted vertically by independent servo motors 31 and each conveyor can have its own linear bearing assembly 29. It should also be apparent that one set of motors could operate four conveyor drive mechanisms. To accomplish this, one motor 22 can use a common shaft or a universal joint connected to a common shaft used by two drive mechanisms.

It should also be apparent that one drive mechanism could be used for each magazine 15, 17 by having one of the gears 52, 53 of each opposing belt mechanisms 50 share a common shaft. Finally, it is also apparent that each conveyor 23 can only include one belt mechanism 50 wherein the endless belt 51 covers the inside width of its respective magazine. Where only one belt mechanism 50 is used, however, the width of the conveyors 23 may not be adjustable.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A storage buffer for storing articles conveyed on a conveyor, comprising:

first and second side walls;

a plurality of pairs of axles, each axle having a wheel mounted thereon, each axle supported in one of said first and second side walls;

a plurality of belts, one of said plurality of belts placed around each pair of wheels corresponding to each of said pairs of axles, each said belt for receiving an edge of an article to be stored;

a recess in a surface of at least one of said first and second walls, located such that at least some of the axles are accessible from said recess; and a circulating belt disposed within said recess for energizing one of said axles to rotate a corresponding wheel and associated belt for moving the article.

2. The storage buffer according to claim 1, further comprising a third side wall having a recess on one surface, wherein the recessed surface is located within two inches of the recessed surface of said first wall.

3. The storage buffer according to claim 1, wherein the first and second side walls are adjustable with respect to each other.

4. The storage buffer according to claim 1, further comprising drive means for driving said circulating belt.

5. A storage buffer for storing articles conveyed on a conveyor, comprising:

four walls each having first and second surfaces;

a recess in the first surface of each wall; and a plurality of axles being mounted on each of said second surfaces, each axle having a wheel mounted thereon, said axles for each wall being accessible from said recess; and a circulating belt located in each recess for engaging a single one of said axles.

6. The storage buffer according to claim 5, further comprising a plurality of belts each surrounding two of the wheels.

7. The storage buffer according to claim 6, further comprising drive means for driving said circulating belt.

8. A storage buffer for storing articles conveyed on a multi lane conveyor, comprising:

a plurality of storage magazines each having side walls, each side wall having wheels mounted thereon;

a plurality of endless belts each engaging at least two wheels;

means for moving said plurality of storage magazines in a direction perpendicular to a direction of conveyance; and a first drive means associated with each of the plurality of storage magazines, each first drive means for rotating one wheel at a time of its associated storage magazine.

9. The storage buffer for a multi lane conveyor according to claim 8, further comprising one drive mechanism for each first drive means, said first drive means driving an associated drive mechanisms, said drive mechanisms each including:

a first endless belt;

a drive wheel engaging said first endless belt, said drive wheel driven by the associated first drive means; and a first wheel engaging said endless belt, said first wheel applying pressure through said endless belt to rotate one of said wheels.

10. The storage buffer for a multi lane conveyor according to claim 9, wherein said drive mechanisms are located within one of the side walls of their associated storage magazines.

11. The storage buffer for a multi lane conveyor according to claim 9, wherein said first wheel is stationary with respect to said storage magazines and remains adjacent to an infeed belt.

12. The storage buffer for a multi lane conveyor according to claim 9, further comprising:

a second drive mechanism associated with each of the plurality of storage magazines, each second drive means engaging and rotating one of the wheels of one endless belt at a time, each second drive means engaging and rotating another of the wheels of the one endless belt at a time; and a second drive means for driving each of said second drive mechanisms.

13. The storage buffer for a multi lane conveyor according to claim 9, wherein each of said drive mechanisms further comprises:

a driven wheel engaging said endless belt; and at least one roller adjacent to said first wheel and engaging an opposite side of said first endless belt other than said first wheel, said first wheel and said at least one roller being movable relative to said drive wheel.

14. The storage buffer for a multi lane conveyor according to claim 13, wherein said drive mechanisms are located within one of the side walls of their associated storage magazines.

15. The storage buffer for a multi lane conveyor according to claim 9, wherein the side walls of each storage magazine are adjustable with respect to each other.

16. The storage buffer for a multi lane conveyor according to claim 15, further comprising a spring loaded bar attached to a shaft of said first wheel for keeping tension on said first endless belt.

17. A storage buffer for a two lane conveyor for conveying articles, comprising:

first and second storage magazines side by side both having two side walls, said storage magazines being vertically adjustable;

a plurality opposed endless belts each engaging at least two wheels, said wheels mounted in each side wall;

means for raising and lowering said first and second storage magazines;

four drive mechanisms, one drive mechanism being located within each of the two side walls of the first and second magazines, each of said drive mechanisms including:

a first endless belt;

a drive wheel engaging said first endless belt, said drive wheel driven by one of said drive means; and a first wheel engaging said endless belt, said first wheel applying pressure through said endless belt to rotate one of said wheels;

first drive means for driving said first set of drive mechanisms; and second drive means for driving said second set of drive mechanisms.

18. The storage buffer for a two lane conveyor according to claim 17, further comprising:

first and second parallel input conveyors for conveying the articles, said first conveyor feeding to the first storage magazine, said second conveyor feeding to the second storage magazine;

first and second parallel output conveyors for conveying the articles, the first storage magazine discharging to said first output conveyor, the second storage magazine discharging to said second output conveyor.

19. The storage buffer for a two lane conveyor according to claim 17, wherein the first storage magazine side walls are adjustable with respect to each other and the second storage magazine side walls are adjustable with respect to each other.

20. The storage buffer for a two lane conveyor according to claim 17, wherein each of said drive mechanisms further comprises:

a driven wheel engaging said endless belt; and at least one opposing roller adjacent to said first wheel and engaging an opposite side of said endless belt other than said first wheel, said first wheel and said at least one opposing roller being movable relative to said drive wheel.

21. The storage buffer for a two lane conveyor according to claim 20, wherein there are two opposing rollers.

22. The storage buffer for a two lane conveyor according to claim 20, further comprising a spring loaded bar attached to one wheel of each endless belt for keeping tension on said first endless belt.

* * * * *